United States Patent [19]
Mennemeier et al.

[11] Patent Number: 6,036,350
[45] Date of Patent: Mar. 14, 2000

[54] METHOD OF SORTING SIGNED NUMBERS AND SOLVING ABSOLUTE DIFFERENCES USING PACKED INSTRUCTIONS

[75] Inventors: Larry Mennemeier, Bolder Creek, Calif.; Alexander Peleg, Haifa, Israel; Carole Dulong, Saratoga; Millind Mittal, South San Francisco, both of Calif.; Benny Eitan, Haifa, Israel; Eiichi Kowashi, Ryugasaki, Japan

[73] Assignee: Intel Corporation, Santa Clara, Calif.

[21] Appl. No.: 08/859,013

[22] Filed: May 20, 1997

Related U.S. Application Data

[63] Continuation of application No. 08/575,605, Dec. 20, 1995, abandoned.

[51] Int. Cl.⁷ .............................. G06F 7/00; G06F 7/50; G06F 7/02
[52] U.S. Cl. .................. 364/715.012; 364/769; 340/146.2
[58] Field of Search ............... 364/715.012, 715.06, 364/769; 340/146.2

[56] References Cited

U.S. PATENT DOCUMENTS

| | | | |
|---|---|---|---|
| 3,711,692 | 1/1973 | Batcher | 235/175 |
| 3,723,715 | 3/1973 | Chen et al. | 235/175 |
| 4,161,784 | 7/1979 | Cushing et al. | 364/748 |
| 4,393,468 | 7/1983 | New | 364/736 |
| 4,418,383 | 11/1983 | Doyle et al. | 364/200 |
| 4,498,177 | 2/1985 | Larson | 371/52 |
| 4,707,800 | 11/1987 | Montrone et al. | 364/788 |
| 4,771,379 | 9/1988 | Ando et al. | 364/200 |
| 4,857,882 | 8/1989 | Wagner et al. | 340/146.2 |
| 4,989,168 | 1/1991 | Kuroda et al. | 364/715.09 |
| 5,095,457 | 3/1992 | Jeong | 364/758 |
| 5,130,692 | 7/1992 | Ando et al. | 340/146.2 |
| 5,148,386 | 9/1992 | Hori | 364/715.01 |
| 5,187,679 | 2/1993 | Vassiliadis | 364/786 |
| 5,241,574 | 8/1993 | Hayashi | 377/39 |
| 5,294,911 | 3/1994 | Uchida et al. | 340/146.2 |
| 5,297,161 | 3/1994 | Ling | 375/1 |
| 5,375,080 | 12/1994 | Davies | 364/736.5 |
| 5,408,670 | 4/1995 | Davies | 395/800 |
| 5,651,121 | 7/1997 | Davies | 395/376 |

OTHER PUBLICATIONS

J. Shipnes, *Graphics Processing with the 88110 RISC Microprocessor*, IEEE (1992), pp 169–174.

*MC88110 Second Generation RISC Microprocessor User's Manual*, Motorola Inc. (1991).

*Errata to MC88110 Second Generation RISC Microprocessor User's Manual*, Motorola Inc. (1992), pp 1–11.

*MC88110 Programmer'Reference Guide*, Motorola Inc. (1992), p 1–4.

*i860 ™ Microprocessor Family Programmer's Reference Manual*, Intel Corporation (1992), Ch. 1, 3, 8, 12.

R. B. Lee, Accelerating Multimedia with Enhanced Microprocessors, IEEE Micro (Apr. 1995), pp 22–32.

*TMS320C2x User's Guide*, Texas Instruments (1993) pp 3–2 through 3–11; 3–28 through 3–34; 4–1 through 4–22; 4–41; 4–103; 4–119 through 4–120; 4–122; 4–150 through 4–151.

L. Gwennap, New PA–RISC Processor Decodes MPEG Video, Microprocessor Report (Jan.1994), pp 16, 17.

(List continued on next page.)

*Primary Examiner*—Tan V. Mai
*Attorney, Agent, or Firm*—Blakely Sokoloff Taylor & Zafman LLP

[57] ABSTRACT

A technique for sorting packed signed numbers of two operands into maxima and minima operands and solving absolute differences for each pair of corresponding values of maxima and minima. After packing two source operands with a plurality of data elements containing signed values, a greater-than comparison operation is performed on each pair of corresponding numbers in the two operands to determine which is greater. An exclusive-OR mask is generated for use in swapping those values which need to be rearranged so that all maxima are in one operand and all minima are in another operand. Once the sorting of maxima and minima is complete, a packed subtraction operation is then performed by subtracting the minima from corresponding maxima to obtain absolute differences.

39 Claims, 5 Drawing Sheets

OTHER PUBLICATIONS

SPARC Tenchology Business, *UltraSPARC Multimedia Capabilities On–Chip Support for Real–Time Video and Advanced Graphics,* Sun Microsystems (Sep., 1994).

Y. Kawakami et al., *LSI Application: A Single–Chip Digital Signal Processor for Voiceband Applications,* Solid State Circuits Conference, Digest of Technical Papers; IEEE International (1980).

B. Case , *Philips Hopes to Displace DSPs with VLIW.* Microprocessor Report (Dec. 94), pp 12–18.

N. Margulis, *i860 Microprocessor Architecture,* McGraw Hill, Inc. (1990) Ch. 6,7,8,10,11.

*Pentium Processor User's Manual, vol. 3: Architecture and Programming Manual,* Intel Corporation (1993), Ch. 1,3,4, 6,8, and 18.

METHOD OF SORTING SIGNED NUMBERS AND SOLVING ABSOLUTE DIFFERENCES USING PACKED INSTRUCTIONS

This is a continuation of application Ser. No. 08/575,605, filed Dec. 20, 1995, now abandoned.

BACKGROUND INVENTION

1. Field of the Invention

The present invention relates to the field of microprocessors and, more particularly, to a technique of sorting signed numbers and finding absolute differences.

2. Prior Art

In the utilization of processors, microprocessors and computer systems, it is the practice to manipulate large amounts of data represented in various forms. For many operations, the data is generally in a scalar format where operations are performed on such scalar values. For example, an adding of two numerical values entails the loading of the two values in two registers and numerically (either in integer form or floating point form) adding the two numbers. In order to speed the execution of current and subsequent instructions, many processors now employ the use of pipe-lining stages to enhance processing speed of the processor. The use of various instructions which operate on two data elements are well-known in the art.

A different type of data representation is a format referred to as "Packed Data" format. In the packed data format, a number of data elements are now grouped together into a common bit string having a specified width. For example, a packed data string may have four individual data elements, each having a specified width. Furthermore as an example, a packed data format having 64 bits may be comprised of four 16-bit data elements. A significant advantage of having such a packed data format resides in the multiple operations which can be performed on the data string. Accordingly, with the noted example above, a packed add instruction can be invoked to add two packed data words (wherein each packed word is comprised of four data elements). In this packed addition, corresponding pairs of data elements of the two words are added. Unlike the scalar add operation, the packed add instruction in this instance would perform four different add operations (one for each pair of corresponding data elements) in parallel in response to a single instruction.

As can be appreciated, a separate set of packed instruction set would be required in order to operate on the packed data format, as well as providing the necessary operations for packing and unpacking the data. Generally, the specialized instruction set can be designed into a general purpose processor at low cost, because most of the circuitry dedicated to scalar operations can be reused. However, such a processor would have significant processing advantages when packed data operations can be used instead of singular data operations.

One area where packed data operations are susceptible for improving performance is in the manipulation of multimedia data. That is, video, graphic and sound data can be manipulated in packed format using packed instructions. A variety of functions can be solved or data rearranged based on the use of the packed instruction set. One such manipulation is the sorting of numbers to determine which number from a pair of numbers is greater (or lesser) in value. One example of such a comparison is to determine if a given value is above or below a threshold value. Another such operation is the solving of an absolute difference between a pair of numbers. Such absolute difference is used to calculate a L1 Norm, which represent the distance between two sets of data. It is used in recognition operations, specifically in speech and handwriting recognition and also used in some image recognition functions as well.

For example, when an absolute difference between two signed numbers is to be obtained, the following operation is implemented:

To solve ABS[X−Y],
  If X>Y, then ABS[X−Y]=X−Y,
    else ABS[X−Y]=Y−X.

which operation, when using prior art techniques, requires a conditional branch to ensure that the smaller signed number is subtracted from the larger number. This conditional branching would need to be implemented for each pair of numbers.

The present invention on the other hand describes a scheme in which a plurality of packed data elements are operated on in parallel to sort the greater values from each pair of numbers into a data string and lesser values from each pair of numbers into another data string, so that the lesser numbers can be subtracted from the larger numbers in a packed format to obtain the absolute difference for each pair of numbers.

SUMMARY OF THE INVENTION

The present invention describes a technique for sorting packed signed numbers of two operands into maxima and minima values and solving absolute differences for each pair of corresponding maxima and minima values. After packing two source operands with a plurality of data elements containing signed values, a comparison operation is performed on the two operands to generate a mask operand (mask). The mask is used to identify those data elements of the first source operand which must be swapped with corresponding data elements of the second source operand so that lesser and equal values (minima) are all arranged together and greater or equal values (maxima) are all arranged together in another operand. Subsequently, the minima are subtracted from the maxima to obtain an absolute difference between each pair of corresponding numbers.

The data elements of the two source operands are exclusively-OR'ed to generate a temporary result which is then logically AND'ed with the mask. The resulting exclusive-OR mask is further exclusive-OR'ed with one source operand to generate a maxima operand and also with the second source operand to generate a minima operand. A packed subtraction operation is then performed by subtracting the minima from corresponding maxima to generate absolute differences of the numbers represented by the data elements. In the particular embodiment, the comparison operation is performed by a packed greater-than instruction which determines for each data element in the first operand, if the signed value is greater than the signed value of the corresponding data element in the second operand.

Economic Advantage: The implementation of a packed instruction set to operate on packed data permits parallel operations to be performed with one instruction. Specifically, a number of absolute differences (four in the preferred embodiment) are obtained instead of just one absolute difference when scalar techniques are used. Furthermore, where scalar techniques require branching instruction(s), no such branching is required with the present invention. Thus, the sequence of instructions of the present invention to manipulate data allows for the sorting of maxima and minima in reduced computational time without the use of branching instructions to generate absolute differences of the pairs of values. The simplicity and reduced use of instructions enhances processing speed and overall performance.

DETAILED DESCRIPTION OF THE PREFERRED EMBODIMENT

A technique for sorting packed signed numbers of two operands so that maxima and minima are rearranged into maxima and minima operands in order to find absolute differences is described. In the particular embodiment, the numbers are packed into a packed data format in the maxima and minima operands, wherein the absolute differences are determined for corresponding pairs of data values in the maxima and minima operands. In the following description, numerous specific details are set forth, such as specific devices, program instructions, logical operations, bit length for data, etc., in order to provide a thorough understanding of the present invention. However, it will be obvious to one skilled in the art that the present invention may be practiced without these specific details. In other instances, well known techniques and structures have not been described in detail in order not to unnecessarily obscure the present invention.

It is to be noted that a preferred embodiment of the present invention is described in reference to a 64-bit packed data string (64-bit word), however, it is readily understood that other embodiments having more or less number of bits can be implemented without departing from the spirit and scope of the present invention. Furthermore, it is appreciated that the present invention need not be limited to the application of microprocessors only, but can be used in applications with other processing devices as well.

Figure 1:
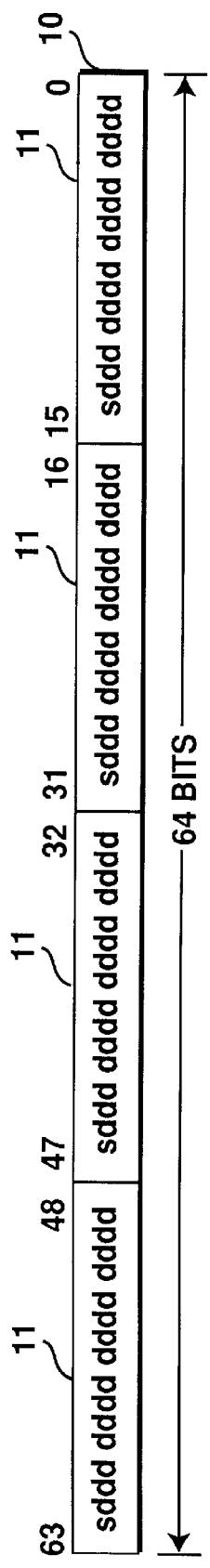
FIG. 1 is a diagram illustrating a packing of four 16-bit signed data element values into a 64-bit packed word.

Referring to FIG. 1, a packed word 10 is shown comprised of four data elements 11. As shown, word 10 is represented to have a length of 64 bits, wherein each data element 11 is 16 bits in length. Each data element 11 is independent of the other in that each represents a value on its own. Thus, each data element can be unpacked from word 10 and repacked with different data elements into a new 64-bit packed word. Although each data element 11 can represent a variety of data types or formats, each data element 11 of the preferred embodiment (as shown in FIG. 1) represents signed data. Accordingly, each data element 11 will have fifteen bits for representing a numeric value and one bit (which is the most significant bit in the 16-bit string) for representing a sign value.

Since it is anticipated that the next generation of microprocessors will operate on a 64-bit architecture, the packed word 10 is shown represented as 64-bits wide. However, the actual width (or bit length) of word 10 is a design choice depending on the processor architecture chosen. The number of data elements 11 packed into word 10 is can also be a design choice, but it can also be a programming choice in which the programmer selects the format of the data elements for packing into word 10. Accordingly, word 10 could be comprised of two data elements of 32-bit width each, four data elements of 16-bit width each or eight data elements of 8-bit width each. Similarly, the same arrangement can be applied to a 32-bit word. Thus, if word 10 is 32 bits wide, then each of the data elements (if four are packed) would be 8 bits wide. If a format for 16-bit data elements is desired, then there will only be two such data elements packed into a 32-bit word. Equivalent partitioning can be devised for a 128-bit system in which the width of word 10 would be 128 bits. Allowing several formats for packing into word 10 permits flexibility to the programmer.

It is also to be noted that the term word for packed word 10 is used to denote the width of the bit string formed by the packing of the data elements 11. The term word in this context need not be defined to coincide to the word-length defined for a particular architecture. Thus, for example, in a system where a single word is 32 bits wide, the packed word 10 of FIG. 1 would have a length corresponding to a double-word (as defined by the system architecture). The specific terminology is not critical to the understanding of the present invention. What is important is that data elements are packed into a bit-string, wherein this packed set of data elements are treated as an operand when program instructions operate on the packed data elements. In the example described herein, four 16-bit data elements are packed into a 64-bit word.

Figure 2:
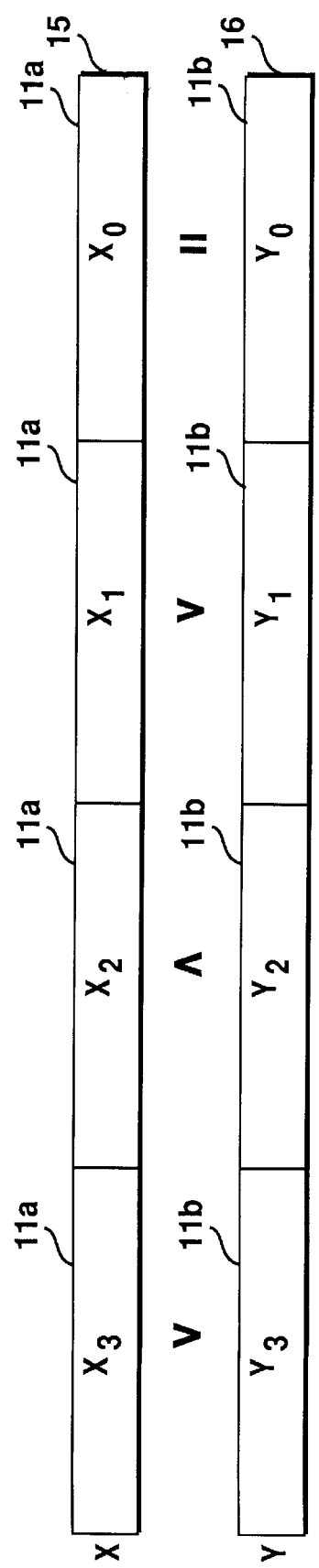
FIG. 2 is a diagram illustrating a numerical comparison relationship between each pair of corresponding data elements of two hypothetical packed operands X and Y.

Referring to FIG. 2, two operands 15 and 16 (also referred to as operands X and Y, respectively) are shown. Each operand 15 and 16 are equivalent to the packed word 10 of FIG. 1. Accordingly, operand X has four data elements 11a identified as $X_0$, $X_1$, $X_2$ and $X_3$, while operand Y has four data elements 11b identified as $Y_0$, $Y_1$, $Y_2$ and $Y_3$. Each of the data elements 11a–b is 16-bits in width and each represents a signed value, as was noted in FIG. 1. Again, this is an illustration of the present invention and the actual format for packing data elements can vary as earlier described. In this particular hypothetical example shown in FIG. 2, a signed numerical value comparison between each of the data elements 11a of operand X and corresponding data elements 11b of operand Y are depicted by arithmetic symbols located between the two operands. In this hypothetical example, $X_3$ is greater than $Y_3$, $X_2$ is less than $Y_2$, $X_1$, is greater than $Y_1$ and $X_0$ is equal to $Y_0$. It is appreciated that the relative comparisons noted for each of the corresponding data elements 11a–b are shown for the exemplary purpose of illustrating the operation of the present invention. It is also to be noted that the term "operand" is interchangeable used herein to refer to the data elements on which an instruction operates or the storage area in which the data can be found.

As will be noted in the subsequent description, a purpose of the present invention is to take two operands (such as operands X and Y), and determine the signed value relationship between corresponding data elements of the two operands and sort them according to the results of the comparison. As will be described in reference to the illustration of FIG. 3, it is desirable to swap data elements between the two operands 15 and 16, so that in the end, the greater of the two values (taking the sign of the data into consideration) for each pair of data elements resides in one packed word, while the lesser-or-equal value of each pair of comparisons resides in another packed word. Essentially, the operation is to sort the pair of operands 15 and 16 so that one operand will contain all of the greater or equal values (maxima) and the second operand will contain the remaining lesser or the other equal values (minima).

Figure 3A:
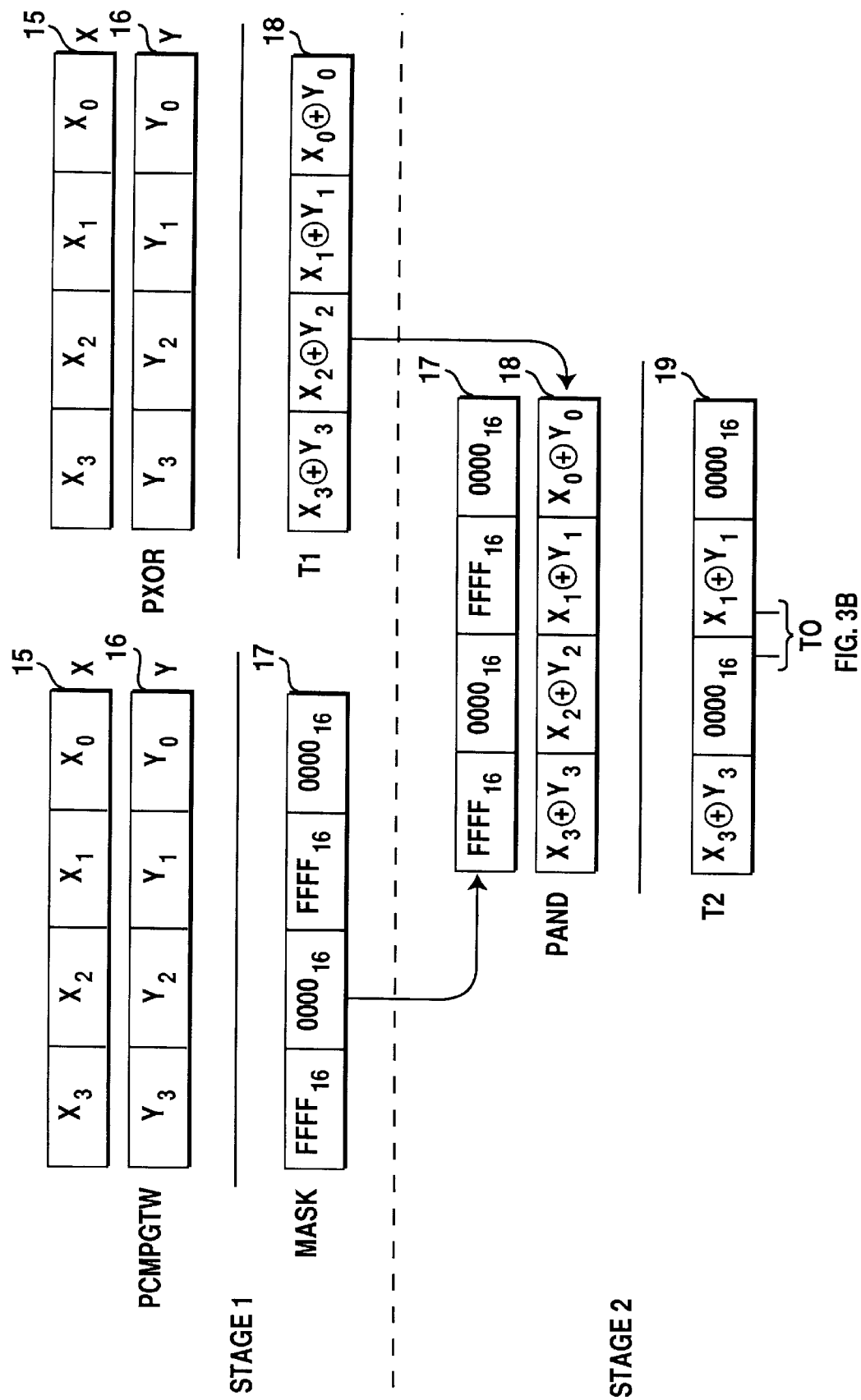
FIGS. 3A and 3B show a sequence diagram illustrating operations performed on packed operands X and Y in order to sort data elements of X and Y into maxima and minima and to determine absolute differences between corresponding data elements of X and Y.
Figure 3B:
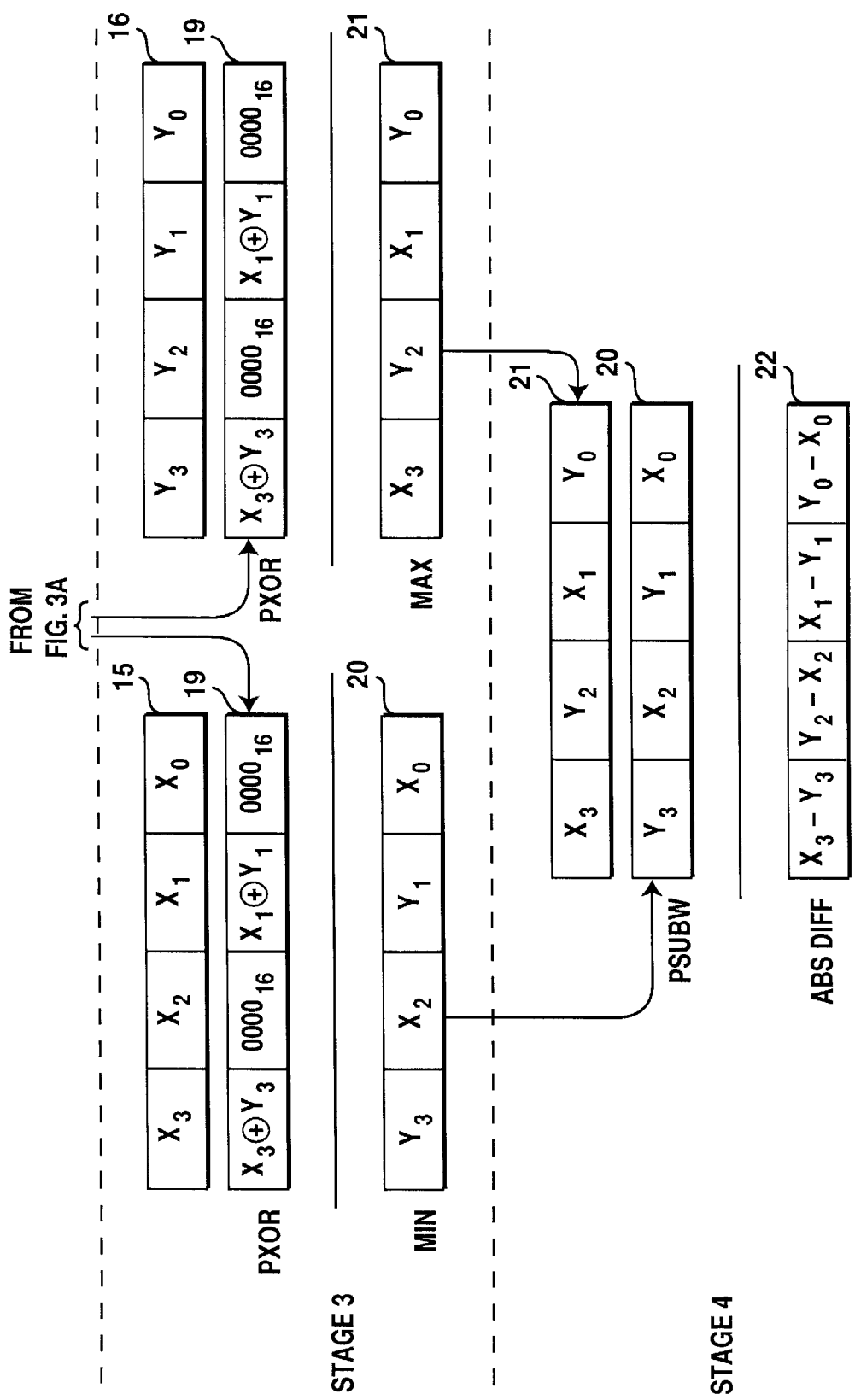

Referring to FIG. 3, four instruction execution stages are shown. The same two operands X and Y of FIG. 2 (with the noted exemplary value comparisons) are used as the starting (source) operands for FIG. 3. Two operations are noted in stage 1, both based on operands X and Y. The first operation of stage 1 takes the first operand (operand X in this instance) and performs a comparison operation on the second operand (operand Y). The particular comparison operation performed on the two operands in FIG. 3 is a comparison for determining if a value in the first operand X is greater than the corresponding value in the second operand Y. That is, for each pair of corresponding data elements in the two operands, the comparison operation determines if the value in operand X is greater than the value in operand Y.

In the preferred embodiment, an instruction identified as a Packed Comparison For Greater Than Word (PCMPGTW) is used to compare each pair of corresponding data elements of operands X and Y. A resultant value, identified as a mask operand 17, is generated as a result of the execution of the PCMPGTW instruction on operands X and Y. Operand 17 has the same packed data format as operands X and Y, but without the sign value. Instead, the data element values will be all ones (1s) or all zeroes (0s), depending on the comparisons. If the comparison is true, then the corresponding data element of operand 17 is filled with all 1s (the true condition is shown by the value $FFFF_{16}$ in operand 17 to denote that all sixteen bits of the data element are 1s). If the comparison is false, then the corresponding data element is filled with all 0s (the false condition is shown by the value $0000_{16}$ in operand 17 to denote that all sixteen bits of the data element are 0s). It is appreciated that the PCMPGTW instruction operates on four packed data elements, each having a width of sixteen bits. However, the PCMPGTW instruction can perform an equivalent operation on other packing formats supported by the architecture.

Since each data element of operand 17 contains $FFFF_{16}$ or $0000_{16}$ depending on the comparison operation, this resultant operand 17 is termed a "mask" and this mask will be used to identify those data elements of operand X which require or do not require swapping. That is, for a particular data element of mask operand 17, a $FFFF_{16}$ result identifies the condition in which the corresponding data element Xi (i being 0, 1, 2 or 3 for the example of the preferred embodiment to identify those data elements of a particular operand, which is operand X in this instance) is greater than the corresponding data element Yi. Where the particular result is $0000_{16}$, the corresponding Xi data element is less-than-or-equal-to the corresponding data element Yi. As will be noted below, the $FFFF_{16}$ value(s) will be used to identify those data elements Xi and Yi that need to be swapped.

The second operation of stage 1 also utilizes operands X and Y, but instead of a comparison operation, the second operation is an exclusive-OR (XOR) performed by a Packed Exclusive-OR (PXOR) instruction operating on the corresponding data elements of operands X and Y. Accordingly, each pair of corresponding data elements Xi and Yi are exclusive-OR'ed to provide results in operand 18 (which is also referred to as a temporary operand T1 in FIG. 3). It is appreciated that in the preferred embodiment, parallel computing (dual-pipelined processing) allows for both PCMPGTW and PXOR instructions to be executed at the same time, so that both the mask operand 17 and the T1 operand 18 are available at the end of stage 1. However, in a system without such parallel computing capability, the two operations would be performed sequentially, instead of in parallel.

During stage 2, the mask operand 17 and the T1 operand 18 are operated upon by a Packed AND (PAND) instruction in which the corresponding pairs of data elements of the two operands 17 and 18 are logically AND'ed to provide a resulting operand 19 (which is also referred to as operand T2 in FIG. 3). The resulting operand T2 of stage 2 is essentially a masked T1 operand. That is, the data elements representing the exclusive-OR result in T1 is/are retained only where the corresponding data element(s) of the mask operand 17 has/have the value $FFFF_{16}$. In the particular example, $T2_3$ and $T2_1$, have retained the exclusive-OR results from T1. The data elements $T2_2$ and $T2_0$ have the value $0000_{16}$. As will be described below, the exclusive-OR values retained as data elements in the T2 operand 19 are used to swap the corresponding Xi and Yi values in stage 3.

During stage 3, another set of parallel operations are performed. In the first operation, data elements of operands X and T2 are exclusive-OR'ed using the afore-mentioned PXOR instruction. In the second operation, data elements of operands Y and T2 are exclusive-OR'ed also using the PXOR instruction. The swapping occurs at the locations where the T2 operand had retained a non-zero result as a data element.

How this is achieved is better understood if the following relationships are first noted:

$$Xi\ PXOR\ 0 = Xi \qquad \text{(Equation 1)}$$

$$Xi\ PXOR\ Yi = T1i \qquad \text{(Equation 2)}$$

$$Xi\ PXOR(Xi\ PXOR\ Yi) = Xi\ PXOR\ T1i = Yi \qquad \text{(Equation 3)}$$

$$Yi\ PXOR(Xi\ PXOR\ Yi) = Yi\ PXOR\ T1i = Xi \qquad \text{(Equation 3)}$$

That is, a value (such as a data element Xi or Yi) when exclusive-OR'ed with zero is itself, but when exclusive-OR'ed with a value T1i (which itself is an exclusive-OR of Xi and Yi), results in Xi becoming Yi and Yi becoming Xi, as noted in Equations 3 and 4. Essentially, the two relationships noted in the above equations results in Xi and Yi swapping locations within the two operands when the mask value is non-zero.

Thus, in stage 3, the exclusive-OR'ing of operands X and T2 is equivalent to the operations noted in Equations 3 and 4, depending on the mask value of T2. The operation results in a minima operand 20. The T2 operand operates as a mask to pass the $X_2$ and $X_0$ data elements to minima operand 20 unchanged. As noted above, the $X_2$ and $X_0$ values represent the lesser or equal values when compared to $Y_2$ and $Y_0$ values and are passed through to the minima operand 20 by the masking operation of operand T2. However, operand T2 operates as an XOR mask to data elements $X_3$ and $X_1$, so that when exclusive-OR'ed to corresponding data elements of T1, the resulting values are $Y_3$ and $Y_1$ in operand 20. Accordingly, all lesser or equal values (minima) now reside in the minima operand 20.

In the particular example, equal values are treated as a minimum value, since the comparison operation in stage 1 sorts the values based on the arithmetic relationship of "greater than." Thus minima operand 20 contains the data element values $Y_3$, $X_2$, $Y_1$ and $X_0$. It should be noted that if the same PCMPGTW operation was performed with operands X and Y reversed (that is, Yi and Xi values are swapped in the operands 15 and 16), the resulting data elements of the minima operand 20 will contain $Y_3$, $X_2$, $Y_1$ and $Y_0$. Where PCMPGTW comparison is made on corresponding Xi and Yi elements which are equal in value, data elements from the first operand 15 will be sorted into the minima operand 20.

Equivalently, the exclusive-OR'ing of operands Y and T2 results in the collection of greater or equal values (maxima) in a maxima operand 21. The masking operation of operand T2 operates to pass through the $Y_2$ and $Y_0$ values, which values are the greater values in the PCMPGTW comparison of stage 1. The $Y_3$ and $Y_1$. data elements are swapped by the exclusive-OR'ing operation to produce $X_3$ and $X_1$ in the corresponding data element positions of maxima operand 21. Accordingly, maxima operand 21 has the greater or equal value for each pair of data elements Xi and Yi. As noted earlier, equal values are treated as a minimum value in the comparison for finding the "greater-than" values, but ultimately one equal value will reside in the minima operand and the other equal value will reside in the maxima operand. In the particular example, $Y_0$ is sorted into the maxima operand 21. Again, if the X and Y operands had been reversed in order for the PCMPGTW comparison, the maxima operand 21 would contain $X_3$, $Y_2$, $X_1$ and $X_0$ as the data elements. The disposition of the equal value data elements is noted for interest. Since a difference of these two values will result in zero (no matter how ordered), the actual placement of equal value data elements ($X_0$ and $Y_0$ in the example) is not critical to the final outcome in stage 4.

Again, it is to be appreciated that the two operations in stage 3 are performed in parallel where such processing is available. Where parallel processing is not available the two operations are performed sequentially. At the conclusion of stage 3, one operand 20 contains those corresponding data elements of Xi and Yi which have the greater or equal value and second operand 21 contains corresponding data elements of Xi and Yi which have the lesser or equal value.

It is appreciated that at the end of stage 3, both X and Y operands have been sorted to produce the maxima and minima operands as a result of a sequence of operations performed by the PCMPGTW, PXOR and PAND instructions (the PXOR instruction is used more than once). For each pair of corresponding data elements for operands X and Y, the ones with the greater or equal value is now sorted into the maxima operand 21. The lesser or the other equal value data elements are sorted into the minima operand 20. Note that where the values are equal, both operands contain that value.

It is also appreciated that in the particular example, a "greater-than" comparison was performed in stage 1 to obtain the mask operand 17. However, it is possible to use other arithmetic relationships as well. Less-than, greater-than-or-equal-to or less-than-or-equal-to relationships can be used for the comparison of data elements of operands X and Y. Appropriate packed instructions will generate the comparison on operands X and Y. A corresponding difference will be noted in the mask being generated, but with corresponding changes to the logical operatives. The sorting of data elements into maxima and minima operands can be achieved. The sorted maxima and minima can now be used for subsequent operations where such sorting results are utilized.

One example of using sorted maxima and minima data element strings is in determining an absolute difference between each pair of corresponding maxima and minima data elements. Thus, as shown in stage 4 of the example of FIG. 3, an absolute difference is determined by subtracting the minima from its corresponding maxima. That is, during stage 4, minima operand 20 is subtracted from the maxima operand 21 to obtain an absolute difference for each pair of data elements. A Packed Subtraction (PSUBW) instruction is used to perform the subtraction of each minima data element from its corresponding maxima data element for all data elements in operands 20 and 21. The results of the subtractions are obtained in operand 22 (identified also as AB DIFF operand). The PSUBW is a single packed instruction which performs this multiple subtraction on the data elements in one instruction cycle.

It is to be appreciated that the absolute difference is obtained from the subtraction of signed numbers. That is, the difference of two 16-bit signed numbers requires a full 16-bit representation (without the sign). Thus, in order to obtain full 16-bit precision, each resulting difference data element in operand 22 requires 16 bits without the sign bit. Therefore, the difference is represented as the absolute difference (unsigned difference) between each pair of maxima and minima. The absolute difference results can now be utilized for other operations requiring such distance assessment between two numbers.

Figure 4:
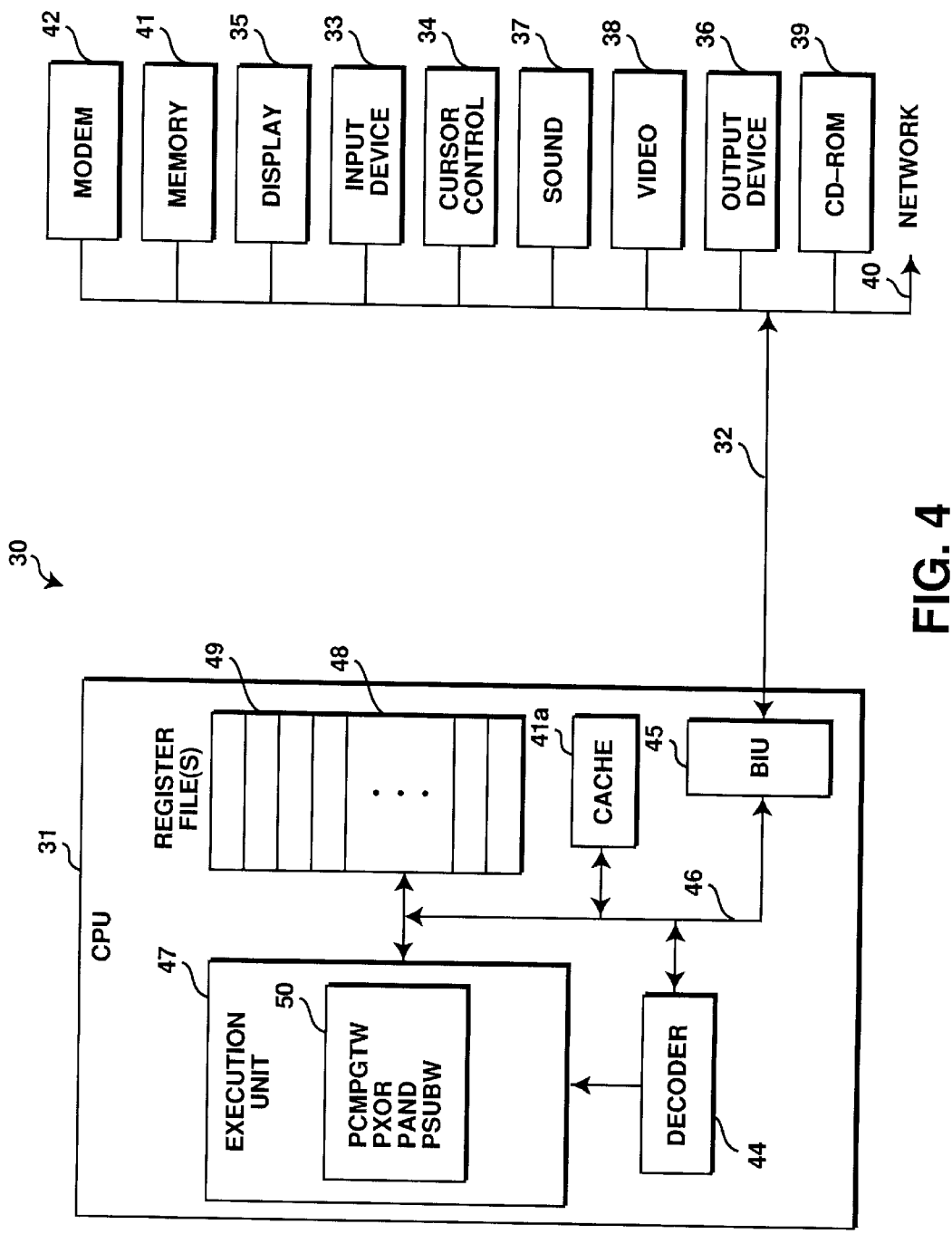
FIG. 4 is a block diagram of an exemplary computer system in which packed instructions are executed in order to practice the scheme of the present invention in sorting signed numbers and finding absolute differences.

It is appreciated that the present invention can be implemented in a variety of ways, but a typical implementation is in a computer system, such as a system shown in FIG. 4. FIG. 4 illustrates a computer system 30 according to one embodiment of the invention. The exemplary computer system 30 is comprised of a processor or central processing unit (CPU) 31 coupled to a variety of devices by a bus 32. In the preferred embodiment, CPU 31 is an integrated circuit microprocessor. Typical devices which are coupled to the bus 32 are an input device 33 (such as a keyboard), a cursor control device 34 (such as a "mouse"), a display unit 35 (such as a video monitor), and an output device 36 (such as a printer). With the advent of multimedia systems, the exemplary computer 30 may include a sound device 37 (such as a sound card and speakers), a video device 38 (such as video accelerators and motion video devices) and a CD-ROM drive and controller 39. The computer 30 may include a modem 42 to provide a communication link to a telephone line. Furthermore, the computer system 30 could be coupled to a network 40 which is coupled to a plurality of other computer systems. It is appreciated that network 40 can be of a variety of communicating medium, including the Internet and its World Wide Web.

The computer system 30 is also coupled to a memory system 41. The memory system 41 provides for the storage of information which will be used by or have been processed by the processor 31. The memory system 41 is represented as a system since it generally is comprised of different types of memory devices. Typically, a volatile main memory is provided in a form of a dynamic random-access-memory (RAM) and a non-volatile mass storage unit is provided in a form of a magnetic disk-drive ("hard" disk) unit. Furthermore, a faster cache memory is usually provided in a form of a static RAM to cache data being used by the processor 31. In some systems, there may be several levels of caches memories. It is also appreciated that the processor itself may have some of the memory resident in the processor chip itself. For example, with current processor technology, level 1 caches are generally chip resident within processor 31. This cache memory internal to the processor is shown as cache memory 41a in FIG. 4. Thus, all of the memory associated with computer system 30 is illustrated by the representation of memory blocks 41 and 41a (in which block 41a is treated as part of memory system 41 from a functional viewpoint). It is appreciated that resident somewhere in this memory system 41 are program routines which instruct the processor 31 how to operate and process data, which data can also be stored within the memory system 41.

Processor 31 is comprised of a number of various functional units, but only those units relevant to the understanding of the present invention are illustrated in FIG. 4. The various devices described above are coupled to processor 30 by the bus 32. Bus 32 is typically identified as a peripheral bus. A bus interface unit (BIU) 45 couples the bus 32 to an internal bus 46. The bus 46 is internal to processor 31 and is utilized for the transfer of information between BIU 45 and units of processor 31. It is to be appreciated that either bus 32 or 46 may be actually comprised of a plurality of buses. A decoder 44, an execution unit 47 and a register file 48 are coupled to bus 46. The decoder 44 is used to receive and decode instructions (such as the instructions of the present invention) which control the operation of the execution unit 47. The execution unit 47 is the core unit within the processor 31 for executing various instructions required by a program routine. Generally, with more advanced processors, the execution unit 47 is comprised of more than one arithmetic-logic unit (ALU) operating in parallel so that more than one computer instruction can be executed at any one time. In the microprocessor of the preferred embodiment, at least two ALUs are present so that two instructions can be executed in parallel.

The register file 48 is comprised of a plurality of individual registers 49 arranged in one or more register files. The register files are used to store information used by the execution unit 47. The proximity of the registers 49 to the execution unit ensures that minimal delay is encountered in processing the information stored within the registers 49. With advanced processors, there will typically be more than one register file 48. For example, an integer register file for operating on integer data and a floating point register file for operating on floating point data are common techniques of using multiple register files. In processors with specialized multimedia instructions, a multimedia register file may be a third form of register file present within processor 31. Thus, although one register file is shown in FIG. 4, it is understood that it may actually be comprised of multiple register files. It is appreciated that the present invention can be implemented with one or more register files.

In a typical processor, such as the exemplary processor 31, there is a set architecture which defines the operation of processor 31. With each architecture, a set of program instructions are defined for use with the processor operating under that architecture. When these instructions are received by the processor, the decoder 44 is capable of decoding the instructions and generating decoded control signals to execute the instructions. Thus, these instructions instruct the processor as to which registers 49 in a particular register file 48 is to be accessed for executing the instruction. It is into this framework that the instructions of the present invention are utilized.

As shown in block 50, the PCMPGTW, PXOR, PAND and PSUBW instructions are designed into the instruction set of the exemplary processor 31, so that the decoder 44 is capable of decoding these instructions and the execution unit 47 is capable of executing on these instructions. Accordingly, values associated with the various operands of FIG. 3 are placed (also referred to as "loaded," "saved" or "stored") in to the registers 49 of register file 48. Generally, where a dedicated multimedia register file is present, the instructions would utilize this register file. However, again there is no requirement that a particular register file be used. Rather, the present invention can be readily used with most types of registers, provided that the bit-length (width) of the registers can accommodate the data being operated on by the instructions. The "P" prefix of the four instructions denote the application of the instructions on packed data elements. As noted earlier, how the data elements are packed into a word having a prescribed number of bits (that is, the number of data elements packed into a word) is a programming choice and there may be several formats available to the programmer. The "packed" instructions of the present invention can be made flexible in order to support all of the available formats. That is, the "packed" instructions of the present invention adapt can adapt to operate on each data element for the various packing formats supported in the system architecture.

Likewise, the circuitry for performing the various operations described in reference to the four instructions resides within processor 31 and generally within execution unit 47. Accordingly, the four instructions of the present invention are shown as part of the instruction set 50 within execution unit 47. Again, it is to be noted that other units, such as instruction and data fetch units, timers and other well-known units within a processor 31 are not shown, since the operation of such units are well-known in the art.

Figure 5:
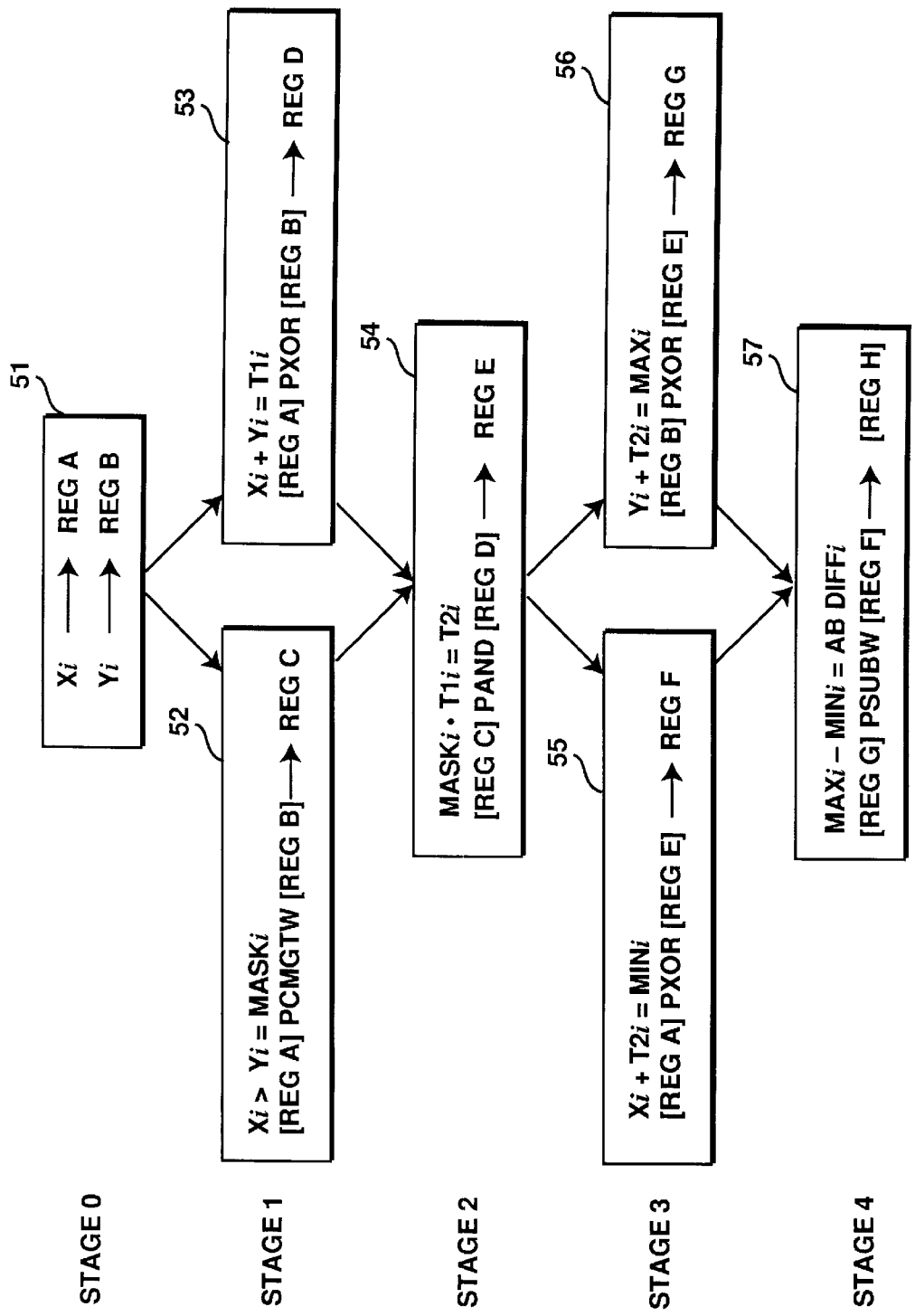
FIG. 5 is a block diagram of an embodiment of the present invention in which each operation of FIG. 3 is linked to registers for executing the instructions to obtain the absolute difference between packed data elements.

Referring to FIG. 5, the operations of the various instructions to perform the sorting operation and to obtain the absolute differences according to the present invention are shown in a flow diagram form. Prior to the commencement of the operations noted in FIG. 3, the data elements which are to comprise operand X in the example are packed and loaded into register A. Similarly, data elements which are to comprise operand Y are packed and loaded into register B. These actions are noted in block 51 and identified as actions pertaining to stage 0.

Subsequently, PCMPGTW instruction performs the greater-than comparison of the contents of the data elements resident in registers A and B (operands X and Y). This action is shown in block 52 and the result (which is the mask operand 17) is placed in register C. In parallel, the contents of registers A and B are exclusively-OR'ed by the PXOR instruction and the resulting T1 values are placed in register D, as shown in block 53. Then in stage 2, the contents of registers C and D are AND'ed by the PAND instruction, as shown in block 54. The resulting operand T2 is placed in register E.

During stage 3, contents of registers A and E are exclusively-OR'ed by the PXOR instruction to provide the minima, which are stored in register F, as shown in block 55. Similarly, contents of registers B and E are exclusively-OR'ed by the PXOR instruction to provide the maxima, which are stored in register G, as shown in block 56. Thus, at the conclusion of stage 3, the minima are sorted into register F and the maxima are sorted into register G. Subsequently, each of the data elements of register F is subtracted from its corresponding data element in register G by the execution of the PSUBW instruction to generate the absolute difference value for each pair of data elements. This is shown in block 57, in which the absolute difference values are stored in register H.

The absolute difference operand in register H can be utilized for further operations and/or stored into another location, such as within memory system 41. It is also appreciated that although registers A–H are noted in the example, some of the registers can actually be reused. For example registers C and D are no longer needed after stage 2 so that registers C and D can be used instead of registers F and G for storing the minima and maxima in stage 3. How the registers are manipulated is a design choice and the purpose of the flow diagram of FIG. 5 is to illustrate one example of how the instructions operate on the registers 49 of the computer system 30 implementing the present invention.

It is appreciated that the computer system 30 can be utilized in a variety of ways to practice the present invention. For example, data can be received as an input from one of the peripheral connections shown in FIG. 4 (such as receiving image data from the network 40 or data input from modem 42). The data is then stored in memory 41. Subsequently, data is packed and loaded into the registers 49 and operations noted in reference to FIGS. 3 and 5 are performed to sort the operands to obtain maxima and minima separation of signed numbers and the sorted values can then be used to obtain absolute differences.

As an example, the present invention can be utilized to provide some of the data processing function in a recognition operation. Furthermore as an example, an input signal can be coupled to the computer system 30 shown in FIG. 4. The signal can be coupled through one of the devices shown. It is understood that if the input signal is not a digital signal (such as speech), then known techniques are used first to convert the analog signal to a digital signal. Then, as part of a pattern recognition process, the input signal is compared to a known reference. Typically, pattern recognition algorithm(s) is/are employed for performing many of the recognition routines.

In the recognition example, the present invention would be utilized to compare input signals to reference data to determine if there are matches. The resulting absolute difference between the input signal and a particular reference would identify the relative distance separating the two values. Smaller the separation, the closer the match. If there isn't a match, the recognition algorithm being utilized will generally determine how the resulting absolute value will be used for subsequent steps in order to narrow the recognition of the input signal. Thus, one example of the use of the present invention is shown and it is to be noted that the use of the present invention is not limited to the above described example.

In reference to the packed instructions noted above, it is appreciated that those particular instructions noted in FIG. 3 for practicing the present invention can be readily substituted by other logical operations without departing from the spirit and scope of the present invention. There are a variety of ways to implement the noted packed instructions of the preferred embodiment, but one description of packed instructions is disclosed in a patent application titled "Set Of Instructions For Operating On Packed Data;" Ser. No. 08/521,360; filed Aug. 31, 1995.

Finally, it is appreciated that the PCMPGTW instruction can be replaced by other arithmetic comparison operatives as well. It is important to note that the comparison instruction does not utilize branching operations to decide on the outcome of the comparison. The PCMPGTW instruction is an arithmetic operation where the sign of the result of the difference between the two operands is used to create a mask. The operation of the particular PCMPGTW instruction of the preferred embodiment is disclosed in a patent application titled "A Microprocessor having A Compare Operation;" Ser. No. 08/349,040; filed Dec. 2, 1994.

Thus, a technique for sorting packed signed numbers of two operands into maxima and minima and solving absolute differences for each pair of corresponding maxima and minima is described.

We claim:

1. In a processor for processing instructions which operate on a plurality of data elements packed into an operand, a method of sorting numerical values into minima and maxima groupings, comprising the steps of:

comparing data elements of a first source operand to corresponding data elements of a second source operand by performing a comparison operation, wherein said data elements of said two source operands represent numerical values, in order to determine a numerical relationship between each pair of said corresponding data elements of said two source operands;

generating a mask operand which has data elements corresponding to a result of said numerical relationship;

performing a first logical operation, which is an exclusive-OR operation, on said corresponding data elements of said two source operands in order to generate a first interim operand in which its data elements correspond to results of said first logical operation;

performing a second logical operation on corresponding data elements of said first interim operand and said mask operand in order to generate a second interim operand in which a value of each of its data elements corresponds to either a corresponding data element from said first interim operand or a masked value from said mask operand;

performing a third logical operation, which is an exclusive-OR operation, on corresponding data elements of said second interim operand and said first source operand to generate a minima operand in which its data elements represent lesser or equal values from each pair of values compared in said comparing step of said two source operands;

performing a fourth logical operation, which is an exclusive-OR operation, on corresponding data elements of said second interim operand and said second source operand to generate a maxima operand having its data elements represent greater or equal values from each pair of values compared in said comparing step of said two source operands.

2. The method of claim 1 further comprising the step of performing an arithmetic operation on corresponding data elements of said maxima and minima operands to subtract said lesser or equal values in said minima operand from corresponding greater or equal values in said maxima operand to generate a difference operand, in which its data elements represent absolute differences of each pair of values in said two source operands.

3. The method of claim 2 wherein said difference operand is generated in four instruction execution cycles in a parallel processing processor.

4. The method of claim 1 in which said step of generating said mask operand generates corresponding data elements having all 1 values or all 0 values, based on comparison of said numerical relationship between each pair of corresponding data elements.

5. The method of claim 4 in which said step of performing said second logical operation is an AND operation, such that a data element of said second interim operand will have a value corresponding to a corresponding data element from said first interim operand, if its corresponding data element in said mask operand has a value of all 1s and it will have a value of all 0s, if its corresponding data element in said mask operand has a value of all 0s.

6. The method of claim 5 in which said step of comparing data elements of said two source operands is based on a greater-than comparison relationship, such that for each pair of corresponding values if said comparison is true, then their corresponding data element in said mask operand is all 1s, but if said comparison is false, then their corresponding data element in said mask operand is all 0s.

7. The method of claim 6 further comprising the step of performing an arithmetic operation on corresponding data elements of said maxima and minima operands to subtract said lesser or equal values in said minima operand from corresponding greater or equal values in said maxima operand to generate a difference operand, in which its data elements represent absolute differences of each pair of values in said two source operands.

8. The method of claim 7 wherein said difference operand is generated in four instruction execution cycles in a parallel processing processor.

9. In a computer in which program instructions operate on data represented by a plurality of data elements packed into an operand, a method of sorting numerical values into minima and maxima groupings, comprising the steps of:
comparing data elements of a first source operand to corresponding data elements of a second source operand by performing a comparison operation, wherein said data elements of said two source operands represent numerical values, in order to determine a numerical relationship between each pair of said corresponding data elements of said two source operands;
generating a mask operand which has data elements corresponding to a result of said numerical relationship;
performing a first logical operation, which is an exclusive-OR operation, on said corresponding data elements of said two source operands in order to generate a first interim operand in which its data elements correspond to results of said first logical operation;
performing a second logical operation on corresponding data elements of said first interim operand and said mask operand in order to generate a second interim operand in which a value of each of its data elements corresponds to either a corresponding data element from said first interim operand or a masked value from said mask operand;
performing a third logical operation, which is an exclusive-OR operation, on corresponding data elements of said second interim operand and said first source operand to generate a minima operand in which its data elements represent lesser or equal values from each pair of values compared in said comparing step of said two source operands;
performing a fourth logical operation, which is an exclusive-OR operation, on corresponding data elements of said second interim operand and said second source operand to generate a maxima operand having its data elements represent greater or equal values from each pair of values compared in said comparing step of said two source operands.

10. The method of claim 9 further comprising the step of performing an arithmetic operation on corresponding data elements of said maxima and minima operands to subtract said lesser or equal values in said minima operand from corresponding greater or equal values in said maxima operand to generate a difference operand, in which its data elements represent absolute differences of each pair of values in said two source operands.

11. The method of claim 10 wherein said difference operand is generated in four instruction execution cycles in a parallel processing processor.

12. The method of claim 9 in which said step of generating said mask operand generates corresponding data elements having all 1 values or all 0 values, based on comparison of said numerical relationship between each pair of corresponding data elements.

13. The method of claim 12 in which said step of performing said second logical operation is an AND operation, such that a data element of said second interim operand will have a value corresponding to a corresponding data element from said first interim operand, if its corresponding data element in said mask operand has a value of all 1s and it will have a value of all 0s, if its corresponding data element in said mask operand has a value of all 0s.

14. The method of claim 13 in which said step of comparing data elements of said two source operands is based on a greater-than comparison relationship, such that for each pair of corresponding values if said comparison is true, then their corresponding data element in said mask operand is all 1s, but if said comparison is false, then their corresponding data element in said mask operand is all 0s.

15. The method of claim 14 further comprising the step of performing an arithmetic operation on corresponding data elements of said maxima and minima operands to subtract said lesser or equal values in said minima operand from corresponding greater or equal values in said maxima operand to generate a difference operand, in which its data elements represent absolute differences of each pair of values in said two source operands.

16. The method of claim 15 wherein said difference operand is generated in four instruction execution cycles in a parallel processing processor.

17. In a processor for processing instructions which operate on a plurality of data elements packed into an operand, a method of sorting numerical values into minima and maxima groupings, comprising the steps of:
executing a first instruction to compare data elements of a first source operand to corresponding data elements of a second source operand, wherein said data elements of said two source operands represent numerical values, in order to determine a numerical relationship between each pair of said corresponding data elements of said two source operands and to generate a mask operand which has data elements corresponding to a result of said numerical relationship;
executing a second instruction, which performs an exclusive-OR (XOR) operation on said corresponding data elements of said two source operands in order to generate a first interim operand in which its data elements correspond to results of said XOR operation;
executing a third instruction, which performs a specified logical operation on corresponding data elements of said first interim operand and said mask operand in order to generate a second interim operand in which a value of each of its data elements corresponds to either a corresponding data element from said first interim operand or a masked value from said mask operand;
executing a fourth instruction, which performs said (XOR) operation on corresponding data elements of said second interim operand and said first source operand to generate a minima operand in which its data elements represent lesser or equal values from each pair of values compared during execution of said first instruction;
executing a fifth instruction, which performs said (XOR) operation on corresponding data elements of said second interim operand and said second source operand to generate a maxima operand having its data elements represent greater or equal values from each pair of values compared during execution of said first instruction.

18. The method of claim 17 further comprising the step of executing a sixth instruction, which performs a subtraction operation on corresponding data elements of said maxima and minima operands to subtract said lesser or equal values in said minima operand from corresponding greater or equal values in said maxima operand to generate a difference operand, in which its data elements represent absolute differences of each pair of values in said two source operands.

19. The method of claim 18 wherein said difference operand is generated in four instruction execution cycles in a parallel processing processor.

20. The method of claim 17 in which said first instruction generates corresponding data elements having all 1 values or all 0 values, based on comparison of said numerical relationship between each pair of corresponding data elements.

21. The method of claim 20 in which said third instruction performs an AND operation as said specified logical operation, such that a data element of said second interim operand will have a value corresponding to a corresponding data element from said first interim operand, if its corresponding data element in said mask operand has a value of all 1s and it will have a value of all 0s, if its corresponding data element in said mask operand has a value of all 0s.

22. The method of claim 21 in which said first instruction compares data elements of said two source operands based on a greater-than comparison relationship, such that for each pair of corresponding values if said comparison is true, then their corresponding data element in said mask operand is all 1s, but if said comparison is false, then their corresponding data element in said mask operand is all 0s.

23. The method of claim 22 further comprising the step of executing a sixth instruction, which performs a subtraction operation on corresponding data elements of said maxima and minima operands to subtract said lesser or equal values in said minima operand from corresponding greater or equal values in said maxima operand to generate a difference operand, in which its data elements represent absolute differences of each pair of values in said two source operands.

24. The method of claim 23 wherein said difference operand is generated in four instruction execution cycles in a parallel processing processor.

25. A machine readable medium having resident thereon a set of program instructions for operating on a plurality of data elements packed into an operand, said program instructions when executed by a processor causes said processor to perform, comprising the steps of:

comparing data elements of a first source operand to corresponding data elements of a second source operand by performing a comparison operation, wherein said data elements of said two source operands represent numerical values, in order to determine a numerical relationship between each pair of said corresponding data elements of said two source operands;

generating a mask operand which has data elements corresponding to a result of said numerical relationship;

performing a first logical operation, which is an exclusive-OR operation, on said corresponding data elements of said two source operands in order to generate a first interim operand in which its data elements correspond to results of said first logical operation;

performing a second logical operation on corresponding data elements of said first interim operand and said mask operand in order to generate a second interim operand in which a value of each of its data elements corresponds to either a corresponding data element from said first interim operand or a masked value from said mask operand;

performing a third logical operation, which is an exclusive-OR operation, on corresponding data elements of said second interim operand and said first source operand to generate a minima operand in which its data elements represent lesser or equal values from each pair of values compared in said comparing step of said two source operands;

performing a fourth logical operation, which is an exclusive-OR operation, on corresponding data elements of said second interim operand and said second source operand to generate a maxima operand having its data elements represent greater or equal values from each pair of values compared in said comparing step of said two source operands.

26. The machine readable medium of claim 25 further comprising the step of performing an arithmetic operation on corresponding data elements of said maxima and minima operands to subtract said lesser or equal values in said minima operand from corresponding greater or equal values in said maxima operand to generate a difference operand, in which its data elements represent absolute differences of each pair of values in said two source operands.

27. The method of claim 26 wherein said difference operand is generated in four instruction execution cycles in a parallel processing processor.

28. The machine readable medium of claim 25 in which said step of generating said mask operand generates corresponding data elements having all 1 values or all 0 values, based on comparison of said numerical relationship between each pair of corresponding data elements.

29. The machine readable medium of claim 28 in which said step of performing said second logical operation is an AND operation, such that a data element of said second interim operand will have a value corresponding to a corresponding data element from said first interim operand, if its corresponding data element in said mask operand has a value of all 1s and it will have a value of all 0s, if its corresponding data element in said mask operand has a value of all 0s.

30. The machine readable medium of claim 29 in which said step of comparing data elements of said two source operands is based on a greater-than comparison relationship, such that for each pair of corresponding values if said comparison is true, then their corresponding data element in said mask operand is all 1s, but if said comparison is false, then their corresponding data element in said mask operand is all 0s.

31. The machine readable medium of claim 30 further comprising the step of performing an arithmetic operation on corresponding data elements of said maxima and minima operands to subtract said lesser or equal values in said minima operand from corresponding greater or equal values in said maxima operand to generate a difference operand, in which its data elements represent absolute differences of each pair of values in said two source operands.

32. The machine readable medium of claim 31 wherein said steps to generate said difference operand is achieved in four instruction execution cycles in a parallel processing processor.

33. A method comprising the computer-implemented steps of:

in response to a first single instruction, comparing in parallel each data element in a first packed data to a different data element in a second packed data, for each pair of compared data elements, storing in a third packed data a corresponding data element that contains all ones or all zeros based on the result of that comparison;

for each pair of compared data elements, performing an exclusive OR operation on that pair of data elements and storing the result as a corresponding data element in a fourth packed data; and selecting all the maxima or all the minima data elements from the pairs of compared data elements by performing logical operations between the corresponding data elements in the first, third, and fourth packed data.

34. The method of claim 33, wherein the exclusive OR operations are performed in parallel in response to a second single instruction.

35. The method of claim 33, wherein said step of selecting includes the steps of:

for each pair of corresponding data elements in the third and fourth packed data, performing an AND operation on that pair of data elements and storing the result as a data element in a fifth packed data;

for each pair of corresponding data elements in the first and fifth packed data, performing the an exclusive OR operation on that pair of data elements and storing the result as a data element in a sixth packed data.

36. The method of claim 35, wherein the AND operations are performed in parallel in response to a second single instruction, and the exclusive OR operations on the first and fifth packed data are performed in parallel in response to a third single instruction.

37. The method of claim 35, further comprising the step of:

for each pair of corresponding data elements in the second and fifth packed data, performing an exclusive OR operation on that pair of data elements and storing the result as a data element in a seventh packed data.

38. The method of claim 37, further comprising the step of:

for each pair of corresponding data elements in the sixth and seventh packed data, subtracting that pair of data elements and storing the result as a data element in an eighth packed data.

39. The method of claim 38, wherein the exclusive OR operations on the first and second packed data are performed in parallel in response to a second single instruction, the AND operations are performed in parallel in response to a third single instruction, the exclusive OR operations on the first and fifth packed data are performed in parallel in response to a fourth single instruction, the exclusive OR operations on the second and fifth packed data are performed in parallel in response to a fifth single instruction, and the subtraction operations are performed in parallel in response to a sixth single instruction.

* * * * *

UNITED STATES PATENT AND TRADEMARK OFFICE
CERTIFICATE OF CORRECTION

PATENT NO. : 6,036,350
DATED : March 14, 2000
INVENTOR(S) : Mennemeier et al.

It is certified that error appears in the above-identified patent and that said Letters Patent is hereby corrected as shown below:

In column 5, at line 33, delete "Is" and insert —1s—.

In column 6, after and $T2_1$, delete ","

Signed and Sealed this

Fifth Day of June, 2001

*Attest:*

*Attesting Officer*

NICHOLAS P. GODICI

*Acting Director of the United States Patent and Trademark Office*